United States Patent [19]

Bernard et al.

[11] Patent Number: 5,077,128
[45] Date of Patent: Dec. 31, 1991

[54] INSULATING PRODUCE MADE IN SITU, FIBRES USED IN ITS COMPOSITION AND A METHOD OF MANUFACTURE

[75] Inventors: Jean-Luc Bernard, Giencourt; Serein Etienne, Creil, both of France

[73] Assignee: Isover Saint-Gobain, Courbevoie, France

[21] Appl. No.: 305,025

[22] Filed: Feb. 2, 1989

Related U.S. Application Data

[62] Division of Ser. No. 103,211, Oct. 1, 1987, Pat. No. 4,849,289.

[30] Foreign Application Priority Data

Oct. 1, 1986 [FR] France ................................. 86 13703

[51] Int. Cl.$^5$ ................................................ B32B 9/00
[52] U.S. Cl. .................................... 428/392; 427/221; 427/426; 427/427; 428/427; 428/704
[58] Field of Search ........................ 427/426, 221, 427; 428/392, 427, 704

Primary Examiner—Bernard Pianalto
Attorney, Agent, or Firm—Oblon, Spivak, McClelland, Maier & Neustadt

[57] ABSTRACT

Fibres, particularly glass or rock wool fibres coated with a modified polyvinyl alcohol-based polymer and suitable for use as a base material to produce a surface coating on a backing by a simultaneous spraying of the coated fibres mixed with water and a cross-linking agent. A method of producing the fibres to make them suitable to be sprayed in the manner described is also provided.

9 Claims, 2 Drawing Sheets

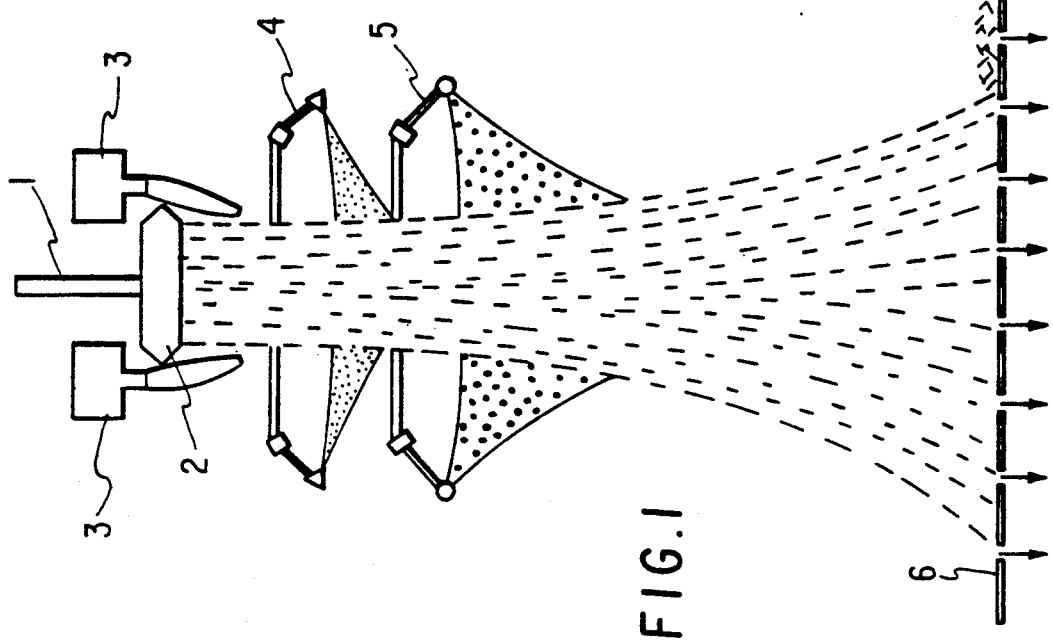
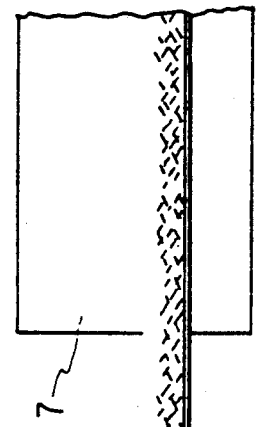

INSULATING PRODUCE MADE IN SITU, FIBRES USED IN ITS COMPOSITION AND A METHOD OF MANUFACTURE

This is a division of application Ser. No. 103,211, filed Oct. 1, 1987, now U.S. Pat. No. 4,849,289.

BACKGROUND OF THE INVENTION

1. Field of the Invention

The current invention relates to the building sector and particularly the surface coating sector, especially with regard to insulation using products, particularly insulants, made in situ from sprayed mineral fibres or particles and binders.

2. Background of the Prior Art

It is known from French Patent No. 2 442 807 corresponding to EP 11572 to insulate a backing by spraying onto it firstly an organic binder consisting of a filmogenic agent in colloidal solution in a solvent and then simultaneously on the one hand and through a first jet, some of the same organic binder as previously in colloidal solution and on the other, through a second jet, a mixture of particles, especially mineral fibres, and a powdered agent, especially borax, to coagulate the organic binder, and possibly pigments and fillers.

This technique is essentially used for the insulation of industrial premises, and when more particularly ceilings are involved, by reason of the action of gravity on the sprayed-on products, heterogeneity is observed in the thickness of the insulant obtained, migration of the binder and of possible colouring pigments in the thickness and their collection together on the surface, which results in the formation of a crust which is unpleasant to look at and also technically harmful, especially from the acoustic insulation and fire-resistance points of view.

These drawbacks are at least partly due to the fact that the binder, being distributed independently of the particles, fibres in particular, does not reach them all and therefore is not only non-uniformly distributed but is also unsatisfactorily retained by the said particles or fibres.

Attempts have been made to reduce the quantity of binder sprayed on in order to reduce the risk of fire but in this case the mechanical properties of the resultant insulant are inadequate.

Further, the quantity of binder which is distributed with the particles, fibers in particular, depends on the settings made by the individual who does the projection.

These settings can be changed during the projection so that the projection of binder can be greatly increased for example to reinforce the adhesion on the backing, thus resulting in an increased risk of fire.

Furthermore, the excessive multiplicity of products which have to be conveyed onto a building site, and the risk of the binder freezing in water, constitute additional drawbacks.

SUMMARY OF THE INVENTION

The present invention sets out to provide a surface coating and in particular an insulation which can be produced in situ by spraying, in which the aforesaid disadvantages of the prior art are overcome, and particularly in which the distribution of the binder through the thickness of the surface coating and particularly through the insulant produced is more homogeneous, resulting in better technical characteristics in the said surface coating, for instance insulant, in which also the proportions of binder are well controlled to avoid the risk of fire.

In an interesting development of the invention, it is likewise possible to resolve the problem of the multiplicity of products needed on a building site in such a way as no longer to have to spray on more than just water at the same time as the fibres or particles.

To this end, the invention proposes a glass or rock wool fibre, generally a particle, coated with a polyvinyl alcohol-based polymer film having free hydrophilic functions which can be subsequently reactivated by water to allow cross-linking of the polymer in the presence of a suitable cross-linking or coagulation agent.

Advantageously, these hydrophilic functions which can be reactivated are carboxyl functions.

Advantageously, the polymer is not completely saponified.

In a preferred embodiment, the invention proposes producing a mixture of such particles or fibres which are coated with the powdered coagulation agent, this mixture being obtained by shredding of caked particles and in particular dried fibre felt and formed at the outlet of the fibre or particle production and coating unit to form elementary lumps of the said particles or flakes of the said fibres to which the powder is added.

By way of application, the invention likewise proposes a method of producing a surface coating, particularly an insulant, on a backing from such coated fibres or particles, the method consisting essentially in spraying onto the backing simultaneously firstly particles of fibres coated with their reactivatable polymer, and on the other, in solution or in dispersion particularly in water, the coagulation agent.

By way of application, the invention proposes a second alternative method of producing a surface coating, particularly an insulant, on a backing from coated fibres or particles, the method essentially consisting in spraying onto the backing simultaneously and firstly the particles or fibres coated with their reactivatable polymer, of which the elementary lumps or flakes are mixed with the powdered coagulation agent, and on the other in spraying water. Advantageously, the coagulation agent is a borate or alumina sulphate.

The invention likewise proposes an apparatus for spraying particles or fibres and liquid onto a backing.

BRIEF DESCRIPTION OF THE DRAWINGS

The invention will now be described in greater detail with reference to he attached drawings which represent:

In FIG. 1: a diagrammatic view of a fibre producing and coating unit according to the invention;

DETAILED DESCRIPTION OF THE PREFERRED EMBODIMENTS

Figure 2:
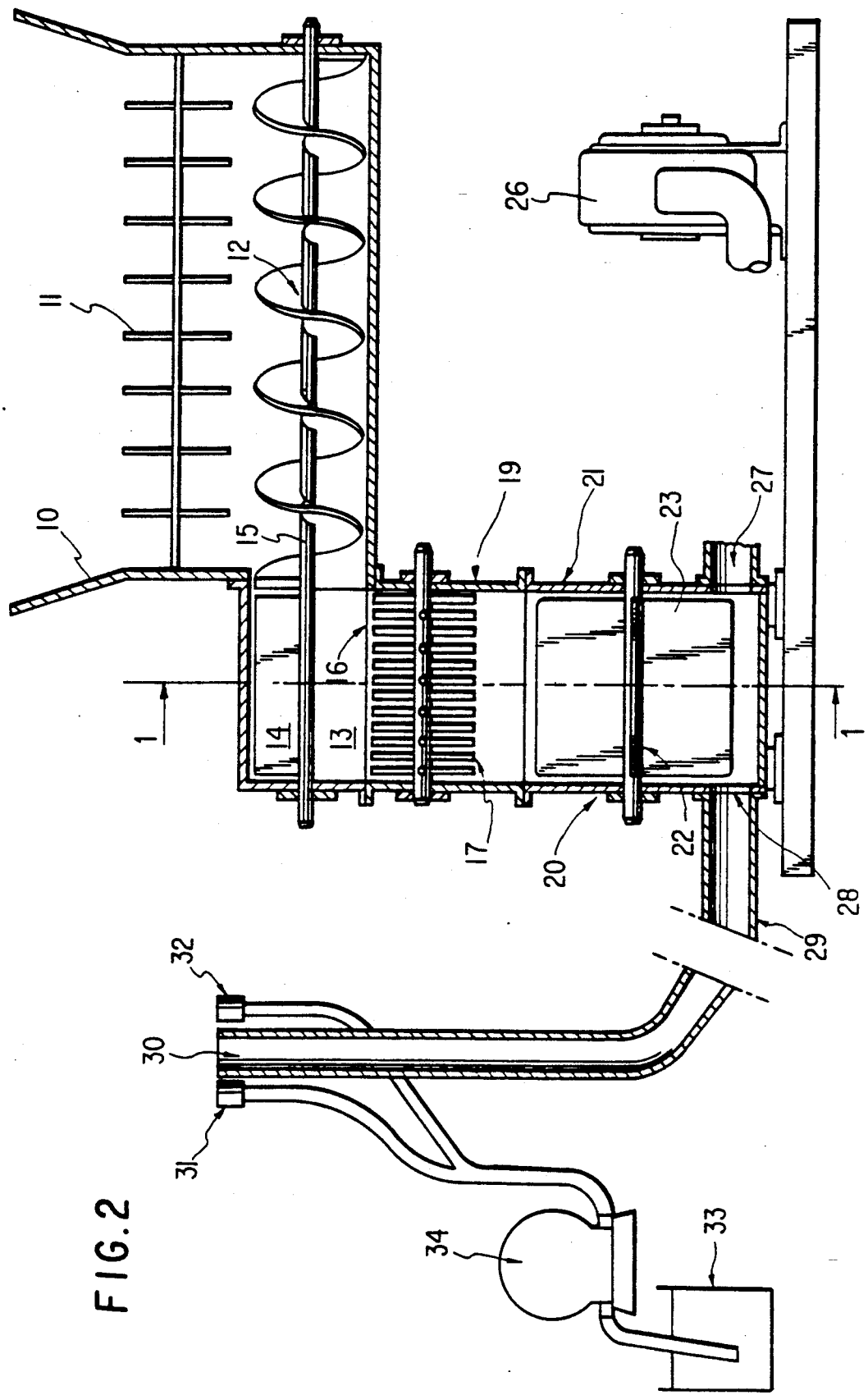
In FIG. 2: a diagrammatic longitudinal section through an apparatus for spraying particles, particularly fibres, and a liquid onto a backing, and In FIG. 3: a cross-section taken on the line II through the apparatus shown in FIG. 2.

The invention relates to particles in general, adapted to be sprayed onto a backing in order to produce thereon a surface coating, for example an insulating surface coating, and it is applied more particularly to fibres, especially glass or rock wool fibres.

In the ensuing description, we will take as an example solely rock or glass wool fibres, but it is understood that other particles are likewise involved such as, for instance, ceramic fibres, expanded balls, particularly glass balls, vermiculite, etc.

The invention involves preparing treated fibres which can be stored and then used subsequently to make a surface coating on a backing by spraying them against the backing, the junction with the backing and the various fibres inter se being brought about by reason of the products used for treating the fibres and preset on the fibres, which are reactivated and cross-linked by the addition of a limited number of additional constituents and in a particularly advantageous form of embodiment due to the addition of water only. This treatment of the fibres consists essentially in surfacing them with a modified polymer based on polyvinyl alcohol and offering capacity for adhesion to the fibres and capacity for subsequent reaction with the water.

Adhesion to the rock wool or glass fibres results from the presence in the polymer chain of functions of the cationic carboxyl type.

Advantageously, this adhesion to the fibres can be improved and/or supplemented by the addition of a surface active agent of the amino oxide, amino lauryl type, which favours wetting of the fibres, spreading of the polymer solution and thus the production of a sheathing film over the major part of the surface of the said fibres.

The capacity for reactivation by water likewise depends on functions present in the polymer chain. Carboxyl functions in addition to those which may have been monopolised in order to ensure engagement on the fibres can hydrolyse rapidly.

This capacity of the polymer for being reactivated by water can advantageously be reinforced by resorting to incompletely saponified polyvinyl alcohol polymers. The saponification rate may thus be limited to around 65 to 85% and preferably 74 to 80%.

Furthermore, it is important that this polymer deposited on the fibres not be cross-linked, or at least not completely at the temperatures which it will have to withstand when it is deposited on the fibres, in order to retain its capacity for being reactivated by water. Thus, if it is deposited on rock wool or glass fibres just prior to their being drawn out, it must be able to remain incompletely cross-linked and generally reactivatable with water, despite temperatures of around 100 to 150° C. which the said fibres must withstand in order to complete their production cycle.

Furthermore, it is necessary that this polymer be capable of easy distribution, because once it has been brought into solution, it must be able to circulate through pumps and equipment designed to distribute it over the fibres. Thus, a viscosity of a 4 to 10% aqueous solution of this polymer at 20° C. of around 5 to 6 centipoises is appropriate.

This low viscosity favours the transformation of the fiber felt into flakes and also the re-wetting of the fibers' polymeric sheaths just before the gel is formed, when the projection on the backing is done.

Of the polymers which exhibit these characteristics and which are therefore suitable, an appropriate commercial product is identified by: "PVA KL 506 of Messrs. KURARAY CO. LTD, OSAKA".

The fibres which are the object of the invention are therefore treated as explained hereinafter.

After the fibres have been drawn out, that is to say after they have been produced, for example in the case of glass fibres, after the fibring of the glass which arrives in a stream 1 through a centrifuge 2, heated and rotating, drawing through the flames of burners 3, possibly aspersion by water, particularly via a first ring 4 of sprayers, the said fibres, in the zone in which their distribution is still homogeneous, are subjected to a second spraying process with an aqueous solution of the sheathing polymer of the invention, from a second ring 5 of sprays. Thus coated, the fibres are received on a receiving belt 6 of a conveyor, through which a suction is exerted. The felt which is thus constituted by the fibres as a whole is then transferred to an oven 7 where it is dried.

Throughout all these operations which follow depositing of the polyvinyl alcohol based polymer on the fibres, the excess water accompanying the said polymer is at least partly eliminated so that the fibres are dry when they leave the oven. A part of the excess water which is not eliminated can be incorporated into the surface coating in gel form.

In a glass fibre production unit such as has been diagrammatically described hereinabove, weights of water identical to weights of produced fibres can be eliminated.

Thus, therefore, polyvinyl alcohol based polymer solutions in a quantity by weight identical to the weight of fibres to be treated will be sprayed at the exit of the fibres from the production stage, the percentage of polymer by weight in the solution being around 2 to 20% and preferably 4 to 10%.

These possibly compressed fibres may be stored thus and be brought out again only when required for use to produce a surface coating, for example an insulating coating, on a backing.

In an alternative method of producing fibres for the same use, the said fibres, pretreated by the polyvinyl alcohol based polymer, are fixed with an agent for cross-linking or coagulating the polymer, and of the borate type, in powdered form.

This cross-linking agent may be deposited on the felt of dried fibres and, possibly compressed, the felt may be stored thus or may be immediately shredded into fibre flakes to facilitate spraying.

The cross-linking agent may likewise be added to the fibres only after or during their transformation to flake form. The addition of powder to the surface of the felt and then a supplementary addition to the flakes is likewise possible.

The preferred cross-linking agent is pentahydrated sodium borate in the form of a fine powder of less than 40 micrometers granulometry. Sodium borate decahydrate may likewise be used.

Larger grain sizes may also be suitable, but it is then less easy for them to penetrate to the heart of the fibres.

It is possible likewise to use other cross-linking agents adapted to bridge the polymer chains, for example alumina sulphate.

Flakes of fibres mixed with the cross-linking agent in powdered form, possibly compressed, can be stored in this way until they are required for use.

To produce a surface coating on the backing, ceiling or the like, it is envisaged simultaneously to spray onto the said backing:

firstly the treated fibres which are shredded into flakes which according to circumstances are alone or may be mixed with the coagulation agent;

second, water which, according to circumstances, contains in solution the coagulation agent if the fibres do not contain it, or is alone if the fibres already contain the coagulation agent.

Of course, there is a possible midway situation: in the event of only part of the powdered cross-linking agent being added to the fibres, the necessary supplement of the said cross-linking agent is brought in solution in the water needed for spraying purposes.

Therefore, the fibres and the liquid are simultaneously sprayed onto the backing which is to be covered. By reason of the capacity of the polymer which sheaths the fibres to become well wet, particularly thanks to the hydrophilic function, especially free carboxylic functions, the wetting, the cross-linking reaction with the borate or the like which forms an homogeneous adhesive gel enclosing each fibre, occurs very rapidly. The low viscosity of the polymeric solution used favours the quick wetting before the gelification. The sheathing of each particular fibre by polymer which is adapted to react facilitates the production of a homogeneous surface coating having desirable and regular mechanical properties.

Advantageously, to facilitate and reinforce adhesion of the surface coating to the backing, it is recommended to previously treat the backing by covering it with a coating of binder consisting of the polymer used for covering each fibre, in solution in water. The polymer content may be greater than in the fibre coating solution.

Whether only water has to be sprayed simultaneously with the fibres or in the other case in which the fibres are sprayed alone while the cross-linking agent is added simultaneously with the sprayed-on water, the mat of fibres obtained has properties which are improved in relation to the prior art fibre mats, these improved properties being due essentially to the fact that the individual fibres have been treated and contain over a substantial proportion of their surface a polymer which is adapted to form an adhesive gel together with the cross-linking agent. In contrast to what has happened in the prior art, this adhesive gel will therefore develop homogeneously through the mass of the mat covering the backing.

The tearing resistance characteristics of the mat which is produced in this way on a backing are about 50% better than those measured in a mat produced by a prior art technique in which the fibres have not been previously treated by the polyvinyl alcohol based polymer.

Furthermore, particularly in the case where only water has to be added to the pretreated fibre mixed with borate or the like, the building site operations are simplified, the satisfactory proportions of the various ingredients used in formation of the adhesive gel being guaranteed by the fibre being prepared in a specialised production unit; the risks of the binder freezing in winter are overcome.

Furthermore, fillers or colouring pigments which it is always possible to add to the fibre, for example in mixture with borate or the like, or with water, will be better distributed over the thickness of the mat obtained and will no longer collect on the underside of the said mat due to migration through gravity; they will be more satisfactorily fixed at the level of each fibre.

By reason of this technique, the fine fibres adapted to produce good thermal insulation but which by reason of the barrier which they offer to penetration of the binder were not widely used in the prior art, can now be used without limitation.

A spraying machine may be employed as shown in FIGS. 2 and 3.

It comprises on the one hand fibre distribution means and on the other liquid distribution means, the liquid being solely water in the preferred embodiment of the invention.

The fibre distribution means comprises filling means such as a hopper 10 into which the fibre is introduced in the form of flakes mixed with the powdered cross-linking agent unless it has already been introduced in solution in the water sprayed on at the same time. This hopper is fitted with a discharge 11 and then a dispenser 12 of the screw type.

The fibres entrained by the screw of the dispenser 12 then enter a compression chamber 13 from which they are extracted by the action of one or a plurality of blades 14 mounted, for instance, on an extension of the shaft 15 of the screw of the dispenser 12.

Under the chamber 13 and connecting therewith through the aperture 16 is a carding assembly generally designated 17.

In the embodiment shown in greater detail in FIG. 3, this assembly 17 comprises two rotary cards 18 inside a housing 19, the said cards being sufficiently close to the mass of fibres compressed in the chamber 13 that their teeth can scrape the mass and detach fibrous particles therefrom. The particles are then introduced into a honeycomb chamber 20. This chamber comprises a stator 21 of generally cylindrical form in which revolves a rotor 22 provided with fins 23 defining cells 24. The sealing-tightness of the cells is provided by tongues 25 of semi-rigid material fixed around the edge of the fins 23.

A gaseous medium, generally air, in a stream emitted by a blower 26, is admitted at the bottom of the stator 21 through the aperture 27. Ejection of the fibrous particles entrained by the stream of gas likewise occurs at the base of the stator 21 through the aperture 28 in a duct 29 terminating at a spray nozzle 30. This nozzle 30 is framed by at least two liquid spray nozzles 31 and 32, particularly for spraying water alone when the borate or the like has been introduced in mixture with the fibres. The nozzles 31 and 32 are supplied with liquid in reserve from a tank 33 by a pump 34.

The surface coating mat thus obtained from rock wool or glass fibres is not very expensive to produce. It has improved mechanical resistance over the mats of the prior art, its fire-preventive properties are improved and its appearance is agreeable. The fibres used to produce it, sheathed by their polymer, are protected until they are used throughout all the processes of shredding, carding, etc., which they undergo. Moreover, the insulation coating can be covered for example with paint. This coating is durable and without any detrimental effect on the backing.

Borate fixes the pH at a value around 9, so that the risk of an acid attack of the metallic parts of the backing does not exist, and so that the risk of a basic attack of the glass fibers does not exist. This insulation coating can be deposited without alteration on backings at room temperature or high temperatures up to, for example, 200° C.

Obviously, numerous modifications and variations of the present invention are possible in light of the above teachings. It is therefore to be understood that within the scope of the appended claims, the invention may be practiced otherwise than s specifically described herein.

What is claimed as new and desired to be secured by Letters Patent of the United States is:

1. A method of producing an insulating surface coating on a backing using mineral fibers wherein the surface of each mineral fibers is sprayed with a film of a polymer comprised of polyvinyl alcohol having free hydrophilic chemical functions adapted for subsequent reactivation by water to allow cross-linking of the polymer in the presence of a suitable cross-linking agent, consisting essentially of simultaneously spraying onto the backing (a) said mineral fibers which have been coated with said reactivatable polymer, further mixed with a coagulation agent and (b) water.

2. A method according to claim 1 wherein the coagulation agent is sodium borate.

3. The method of claim 2, wherein said coagulation agent is selected from the group consisting of sodium borate pentahydrate, sodium borate decahydrate, alumina sulphate, and mixtures thereof.

4. A method according to claim 1 wherein the total quantity by weight of coagulation agent is about the same as that of the polymer.

5. Method according to claim 1 wherein the backing is first covered with a coating of said polymer in solution in water.

6. Method according to claim 1 wherein fillers or colouring pigments are added to at least one of said mineral fibers or liquid sprayed on.

7. Surface coating insulating product obtained according to the process of claim 1 and which is homogeneous throughout its thickness.

8. A method of producing an insulating surface coating on a backing, consisting essentially of spraying onto the backing simultaneously (a) mineral fibers wherein the surface of each mineral fiber is sprayed with a film of polymer comprised of polyvinyl alcohol having free hydrophilic chemical functions adapted for subsequent reactivation by water to allow cross-linking of the polymer in the presence of a suitable cross-linking agent and (b) water containing a coagulation agent in solution.

9. A method of producing an insulating surface coating on a backing using mineral fibers wherein the surface of each said mineral fiber is sprayed with a film of a polymer comprised of polyvinyl alcohol having free hydrophyilic chemical functions adapted for subsequent reactivation by water to allow cross-linking of the polymer in the presence of a suitable cross-linking agent, consisting essentially of spraying onto the backing simultaneously (a) said mineral fibers coated with said reactivatable polymer mixed with a coagulation agent, and (b) water containing coagulation agent in suspension.

* * * * *

UNITED STATES PATENT AND TRADEMARK OFFICE
CERTIFICATE OF CORRECTION

PATENT NO. : 5,077,128
DATED     : December 31, 1991
INVENTOR(S) : Jean-Luc Bernard et al.

It is certified that error appears in the above-identified patent and that said Letters Patent is hereby corrected as shown below:

On the title page, item [54] and column 1, line 2, the title is incorrect, should be, --INSULATING PRODUCT MADE IN SITU, FIBRES USED IN ITS COMPOSITION AND A METHOD OF MANUFACTURE--.

Signed and Sealed this

Twelfth Day of October, 1993

Attest:

BRUCE LEHMAN

*Attesting Officer*

*Commissioner of Patents and Trademarks*